United States Patent
Taraiya et al.

(10) Patent No.: US 12,066,145 B2
(45) Date of Patent: Aug. 20, 2024

(54) BIAXIALLY ORIENTED PIPE

(71) Applicant: SABIC GLOBAL TECHNOLOGIES B.V., Bergen op Zoom (NL)

(72) Inventors: Ajay Kumar Taraiya, Maastricht (NL); Maria Soliman, Selfkant (DE); Peter Degenhart, Echt (NL); Mark Johannes Boerakker, Eindhoven (NL); Henrica Norberta Alberta Maria Steenbakkers-Menting, Susteren (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 17/762,409

(22) PCT Filed: Sep. 23, 2020

(86) PCT No.: PCT/EP2020/076520
§ 371 (c)(1),
(2) Date: Mar. 22, 2022

(87) PCT Pub. No.: WO2021/058533
PCT Pub. Date: Apr. 1, 2021

(65) Prior Publication Data
US 2022/0349499 A1    Nov. 3, 2022

(30) Foreign Application Priority Data

Sep. 24, 2019    (EP) .................................... 19199219

(51) Int. Cl.
| | |
|---|---|
| *F16L 9/12* | (2006.01) |
| *B29C 55/00* | (2006.01) |
| *B29C 55/26* | (2006.01) |
| *B29K 23/00* | (2006.01) |
| *B29L 23/00* | (2006.01) |

(52) U.S. Cl.
CPC .............. *F16L 9/12* (2013.01); *B29C 55/005* (2013.01); *B29C 55/26* (2013.01); *B29K 2023/16* (2013.01); *B29L 2023/22* (2013.01)

(58) Field of Classification Search
CPC ... B29C 55/005; B29C 55/26; B29K 2023/16; B29L 2023/22; F16L 9/12
See application file for complete search history.

(56) References Cited

U.S. PATENT DOCUMENTS

| | | |
|---|---|---|
| 5,910,346 A | 6/1999 | Ward et al. |
| 6,325,959 B1 | 12/2001 | Ek et al. |
| 2002/0107351 A1 | 8/2002 | Tsuji et al. |

FOREIGN PATENT DOCUMENTS

EP    1788023 A1    5/2007

OTHER PUBLICATIONS

C. C. Morath et al., "Biaxially oriented polypropylene pipes: implications for impact and hydrostatic pressure resistance," Plastics, Rubber and Composites, Macromolecular Engineering, vol. 35, 2006—Issue 10, pp. 447-454.
International Search Report; International Application No. PCT/EP2020/076520; International Filing Date: Sep. 23, 2020; Date of Mailing: Nov. 5, 2020; 12 pages.
Written Opinion; International Application No. PCT/EP2020/076520; International Filing Date: Sep. 23, 2020; Date of Mailing: Nov. 5, 2020; 12 pages.

*Primary Examiner* — Yan Lan
(74) *Attorney, Agent, or Firm* — CANTOR COLBURN LLP

(57) ABSTRACT

The invention relates to a biaxially oriented pipe made of a polymer composition comprising a propylene-based polymer, wherein the propylene-based polymer comprises a random copolymer of propylene and a comonomer which is ethylene and/or an a-olefin having 4 to 10 carbon atoms, wherein the propylene-based polymer has a comonomer content of 0.5 to 3.8 wt % based on the propylene-based polymer.

19 Claims, No Drawings

BIAXIALLY ORIENTED PIPE

CROSS REFERENCE TO RELATED APPLICATIONS

This application is a National Stage application of PCT/EP2020/076520, filed Sep. 23, 2020, which claims the benefit of European Application No. 19199219.7, filed Sep. 24, 2019, both of which are incorporated by reference in their entirety herein.

It is known to improve the physical and mechanical properties of a polymer material by orienting the material. In many cases, orienting a material to improve a property in one direction leads to worsening of the same property in the direction perpendicular to the direction of orientation. In order to adapt the properties in both directions, a biaxial orientation of the material may be applied. The biaxial orientation means that the polymer material is oriented in two directions, perpendicular to one another. A pipe can be oriented in the axial direction and peripheral direction (hoop direction) to improve properties such as long-term hydrostatic pressure performance and low temperature impact.

A pipe made by a biaxial elongation of a polypropylene composition is known. U.S. Pat. No. 5,910,346 describes a drawn tube made from a tube of isotropic polypropylene (ICI grade GSE 108). Morath et al., Biaxially oriented polypropylene pipes, Plastics, Rubber and Composites 2006 vol 35 no 10, p. 447-454 describes a biaxially oriented polypropylene pipe made from a random polypropylene copolymer with melt flow rate of 0.3 dg/min and an ethylene content of 4%.

One of the most important properties for pipes is the resistance to crack propagation.

It is an objective of the present invention to provide a biaxially oriented polypropylene pipe with good long-term hydrostatic pressure performance.

Accordingly, the present invention provides a biaxially oriented pipe made of a polymer composition comprising a propylene-based polymer, wherein the propylene-based polymer comprises a random copolymer of propylene and a comonomer which is ethylene and/or an α-olefin having 4 to 10 carbon atoms, wherein the propylene-based polymer has a comonomer content of 0.1 to 3.8 wt % based on the propylene-based polymer.

A biaxially oriented pipe made from a polymer composition means a biaxially oriented pipe made by a process comprising the steps of:
a) forming a polymer composition into a tube, and
b) stretching the tube of step a) in the axial direction and in the peripheral direction to obtain the biaxially oriented pipe.

The term "comonomer content" is herein understood as the amount of comonomer-derived units. The total of the comonomer content and the amount of propylene-derived units in a propylene-based polymer is 100%.

The terms "pipe" and "tube" are herein understood as a hollow elongated article, which may have a cross section of various shapes. The cross section may e.g. be circular, elliptical, square, rectangular or triangular. The term "diameter" is herein understood as the largest dimension of the cross section.

It was surprisingly found that the biaxially oriented pipe according to the invention has an excellent long-term hydrostatic pressure performance.

PROPYLENE-BASED POLYMER

The propylene-based polymer comprises a random copolymer of propylene and a comonomer selected from ethylene and/or an α-olefin having 4 to 10 carbon atoms. It will be appreciated that the copolymer may be made from propylene and one comonomer species or more than one comonomer species (e.g. terpolymer). Preferably, the comonomer is ethylene, 1-butene, 1-hexene and/or 1-octene, for example ethylene (thus the random copolymer is propylene-ethylene copolymer); ethylene and 1-butene (propylene-ethylene-1-butene terpolymer); ethylene and 1-hexene (propylene-ethylene-1-hexene terpolymer) or ethylene and 1-octene (propylene-ethylene-1-octene terpolymer). Most preferably, the comonomer is ethylene.

Preferably, the propylene-based polymer is a propylene-ethylene copolymer, i.e. the comonomer units in the propylene-based polymer are ethylene-derived units.

Preferably, the propylene-based polymer has a melt flow index of 0.1 to 10.0 g/10 min, more preferably 0.1 to 4.0 g/10 min, particularly preferably 0.1 to 1.0 g/10 min, measured according to ISO1133-1:2011 (230° C./2.16 kg).

Preferably, the amount of the random copolymer with respect to the propylene-based polymer is 50 to 100 wt %, for example more than 50 wt %, at least 55 wt %, at least 60 wt %, at least 70 wt %, at least 80 wt %, at least 90 wt %, at least 95 wt %, at least 98 wt %, at least 99 wt % or 100 wt %.

The polymer composition according to the invention comprises a propylene-based polymer. The propylene-based polymer comprises a random copolymer. The random copolymer may comprise, preferably consists of,
A) a low comonomer random copolymer of propylene and a comonomer which is ethylene and/or an α-olefin having 4 to 10 carbon atoms, wherein the low comonomer random copolymer has a comonomer content of less than 3.8 wt % based on the low comonomer random copolymer and/or
B) a high comonomer random copolymer of propylene and a comonomer which is ethylene and/or an α-olefin having 4 to 10 carbon atoms, wherein the high comonomer random copolymer has a comonomer content of at least 3.8 wt % based on the high comonomer random copolymer.

The propylene-based polymer may further comprise C) a propylene homopolymer.

It will be appreciated that the amounts of A), B) and C) are chosen such that the comonomer content of the propylene-based polymer is 0.1 to 3.8 wt % based on the propylene-based polymer and thus the propylene-based polymer does not comprise only B) or only C).

Typically, the total amount of A), B) and C) is at least 95 wt %, at least 98 wt %, at least 99 wt % or 100 wt % based on the propylene-based polymer.

The comonomer content of the propylene-based polymer is determined by the comonomer contents and the weight ratio of the components such as A), B) and C) in the propylene-based polymer. The comonomer content of the propylene-based polymer is 0.1 to 3.8 wt %, for example at least 0.5 wt % or at least 1.0 wt % and/or at most 3.7 wt %, at most 3.6 wt %, at most 3.5 wt %, at most 3.4 wt %, at most 3.0 wt %, at most 2.5 wt % or at most 2.0 wt %, preferably 0.5 to 3.5 wt %, more preferably 0.5 to 3.4 wt %, more preferably 0.5 to 3.0 wt % more preferably 1.0 to 2.0 wt %, based on the propylene-based polymer.

Preferably, the comonomer content of the low comonomer random copolymers is at least 0.1 to 3.8 wt %, for example at least 0.5 wt % or at least 1.0 wt % and/or at most 3.7 wt %, at most 3.6 wt %, at most 3.5 wt %, at most 3.4 wt %, at most 3.0 wt %, at most 2.5 wt % or at most 2.0 wt %, preferably 0.5 to 3.5 wt %, more preferably 0.5 to 3.4 wt %, 0.5 to 3.0 wt % or 1.0 to 2.0 wt %, based on said random polymer. In the low comonomer random copolymer, the comonomer is ethylene and/or an α-olefin having 4 to 10 carbon atoms. Preferably, the comonomer is ethylene, 1-butene, 1-hexene and/or 1-octene, for example ethylene; ethylene and 1-butene; ethylene and 1-hexene or ethylene and 1-octene. Most preferably, the comonomer is ethylene. Preferably, the low comonomer random copolymer has a melt flow index of 0.1 to 10.0 g/10 min, more preferably 0.1 to 4.0 g/10 min, more preferably 0.1 to 1.0 g/10 min, measured according to ISO1133-1:2011 (230° C./2.16 kg).

Preferably, the comonomer content of the high comonomer random copolymers is typically 3.8 to 10.0 wt %, for example 4.0 to 8.0 wt % or 4.2 to 6.0 wt % based on said random copolymer. In the high comonomer random copolymer, the comonomer is ethylene and/or an α-olefin having 4 to 10 carbon atoms. Preferably, the comonomer is ethylene, 1-butene, 1-hexene and/or 1-octene. Most preferably, the comonomer is ethylene. Preferably, the high comonomer random copolymer has a melt flow index of 0.1 to 10.0 g/10 min, more preferably 0.1 to 4.0 g/10 min, more preferably 0.1 to 1.0 g/10 min, measured according to ISO1133-1:2011 (230° C./2.16 kg).

Preferably, the propylene homopolymer has a melt flow index of 0.1 to 10.0 g/10 min, more preferably 0.1 to 4.0 g/10 min, more preferably 0.1 to 1.0 g/10 min, measured according to ISO1133-1:2011 (230° C./2.16 kg).

The propylene-based polymer may consist of A).

The propylene-based polymer may consist of A) and B). Preferably, the weight ratio of A) to B) is 1:10 to 10:1.

The propylene-based polymer may consist of A) and C). Preferably, the weight ratio of A) to C) is 1:10 to 10:1.

The propylene-based polymer may consist of B) and C). Preferably, the weight ratio of B) to C) is 1:10 to 10:1.

The propylene-based polymer may consist of A), B) and C). Preferably, the weight ratio of A) to B) is 1:10 to 10:1 and the weight ratio of A) to C) is 1:10 to 10:1.

In some embodiments, A) consists of one type of the low comonomer random copolymer.

In some embodiments, A) consists of at least two types of the low comonomer random copolymer wherein the comonomer contents and/or the melt flow index measured according to ISO1133-1:2011 (230° C./2.16 kg) of the at least two types of the low comonomer random copolymer are different from each other. It will be appreciated that the comonomer content and the melt flow index of A) is determined by the weight ratio of the components in A).

In some embodiments, B) consists of one type of the high comonomer random copolymer.

In some embodiments, B) consists of at least two types of the high comonomer random copolymer wherein the comonomer contents and/or the melt flow index measured according to ISO1133-1:2011 (230° C./2.16 kg) of the at least two types of the high comonomer random copolymers are different from each other.

In some embodiments, C) consists of one type of the propylene homopolymer.

In some embodiments, C) consists of at least two types of the propylene homopolymer wherein the melt flow index measured according to ISO1133-1:2011 (230° C./2.16 kg) of the at least two types of the propylene homopolymer are different from each other.

In some preferred embodiments, the propylene-based polymer consists of A), wherein A) consists of one type of the low comonomer random copolymer, wherein the comonomer of the low comonomer random copolymer is ethylene and the propylene-based polymer has a melt flow index of 0.1 to 1.0 g/10 min measured according to ISO1133-1:2011 (230° C./2.16 kg).

In some preferred embodiments, the propylene-based polymer consists of A), wherein A) consists of at least two types of the low comonomer random copolymer, wherein the comonomer of each of the at least two types of the low comonomer random copolymer is ethylene and the propylene-based polymer has a melt flow index of 0.1 to 1.0 g/10 min measured according to ISO1133-1:2011 (230° C./2.16 kg).

In some preferred embodiments, the propylene-based polymer consists of A) and B), wherein
  A) consists of one type of the low comonomer random copolymer,
  B) consists of one type of the high comonomer random copolymer
  the comonomer of the low comonomer random copolymer and the high comonomer random copolymer is ethylene,
  the low comonomer random copolymer has a melt flow index of 0.1 to 1.0 g/10 min measured according to ISO1133-1:2011 (230° C./2.16 kg),
  the high comonomer random copolymer has a melt flow index of 1.1 to 10.0 g/10 min measured according to ISO1133-1:2011 (230° C./2.16 kg),
  the weight ratio of A) to B) is 1:10 to 10:1,
  the propylene-based polymer has a melt flow index of 0.1 to 1.0 g/10 min measured according to ISO1133-1:2011 (230° C./2.16 kg).

In some preferred embodiments, the propylene-based polymer consists of A) and C), wherein
  A) consists of one type of the low comonomer random copolymer,
  C) consists of one type of the propylene homopolymer,
  the comonomer of the low comonomer random copolymer is ethylene,
  the low comonomer random copolymer has a melt flow index of 0.1 to 1.0 g/10 min measured according to ISO1133-1:2011 (230° C./2.16 kg),
  the propylene homopolymer has a melt flow index of 0.1 to 10.0 g/10 min, measured according to ISO1133-1:2011 (230° C./2.16 kg),
  the weight ratio of A) to C) is 1:10 to 10:1,
  the propylene-based polymer has a melt flow index of 0.1 to 1.0 g/10 min measured according to ISO1133-1:2011 (230° C./2.16 kg).

In some preferred embodiments, the propylene-based polymer consists of B) and C), wherein
  B) consists of one type of the high comonomer random copolymer
  C) consists of one type of the propylene homopolymer,
  the comonomer of the high comonomer random copolymer is ethylene,
  the high comonomer random copolymer has a melt flow index of 0.1 to 1.0 g/10 min measured according to ISO1133-1:2011 (230° C./2.16 kg),
  the propylene homopolymer has a melt flow index of 0.1 to 10.0 g/10 min, measured according to ISO1133-1:2011 (230° C./2.16 kg),
  the weight ratio of B) to C) is 1:10 to 10:1,
  the propylene-based polymer has a melt flow index of 0.1 to 1.0 g/10 min measured according to ISO1133-1:2011 (230° C./2.16 kg).

Preferably, the polymer composition comprising the propylene-based polymer essentially comprises no further polymers other than said propylene-based polymer. The amount of the propylene-based polymer with respect to the total amount of polymers in the polymer composition may be at least 95 wt %, at least 98 wt %, at least 99 wt % or 100 wt %.

The polymer composition may comprise components other than the propylene-based polymer, such as additives and fillers.

Examples of the additives include nucleating agents; stabilisers, e.g. heat stabilisers, anti-oxidants, UV stabilizers; colorants, like pigments and dyes; clarifiers; surface tension modifiers; lubricants; flame-retardants; mould-release agents; flow improving agents; plasticizers; anti-static agents; external elastomeric impact modifiers; blowing agents; and/or components that enhance interfacial bonding between polymer and filler, such as a maleated polyethylene. The amount of the additives is typically 0 to 5 wt %, for example 1 to 3 wt %, with respect to the total composition.

Examples of fillers include glass fibers, talc, mica, nanoclay. The amount of fillers is typically 0 to 40 wt %, for example 5 to 30 wt % or 10 to 25 wt %, with respect to the total composition.

Accordingly, in some embodiments, the polymer composition further comprises 0 to 5 wt % of additives and 0 to 40 wt % of fillers.

The polymer composition may be obtained by melt-mixing the propylene-based polymer with any other optional components.

Preferably, the total amount of the propylene-based polymer and the optional additives and the optional fillers is 100 wt % with respect to the total composition.

Process Steps

The biaxially oriented pipe is made by a process comprising the steps of:
  a) forming a polymer composition into a tube, and
  b) stretching the tube of step a) in the axial direction and in the peripheral direction to obtain the biaxially oriented pipe.

The process for making the pipe may be performed as a continuous process or a batch-wise process. A continuous process is herein understood as a process wherein the polymer composition is continuously fed for the tube making step a), while the drawing step b) is continuously performed.

The polymer composition may be formed into a tube (step a) by any known method, such as extrusion or injection moulding. The biaxial elongation (step b) may be performed by any known method.

Methods for forming the polymer composition into a tube and the biaxial elongation of the tube are described in U.S. Pat. No. 6,325,959:

A conventional plant for extrusion of plastic pipes comprises an extruder, a nozzle, a calibrating device, cooling equipment, a pulling device, and a device for cutting or for coiling-up the pipe. By the molten mass of polymer on its way from the extruder through the nozzle and up to calibration, cooling and finished pipe being subjected to shear and elongation etc. in the axial direction of the pipe, an essentially uniaxial orientation of the pipe in its axial direction will be obtained. A further reason that contributes to the orientation of the polymer material in the direction of material flow is that the pipe can be subjected to tension in connection with the manufacture.

To achieve biaxial orientation, this plant can be supplemented, downstream of the pulling device, with a device for temperature control of the pipe to a temperature that is suitable for biaxial orientation of the pipe, an orienting device, a calibrating device, a cooling device, and a pulling device which supplies the biaxially oriented pipe to a cutting device or coiler.

The biaxial orientation can also be carried out in direct connection with the first calibration after extrusion, in which case the above-described supplementary equipment succeeds the first calibrating device.

The biaxial orientation of the pipe can be carried out in various ways, for instance mechanically by means of an internal mandrel, or by an internal pressurised fluid, such as air or water or the like. A further method is the orienting of the pipe by means of rollers, for instance by arranging the pipe on a mandrel and rotating the mandrel and the pipe relative to one or more pressure rollers engaging the pipe, or via internally arranged pressure rollers that are rotated relative to the pipe against an externally arranged mould or calibrating device.

Further, Morath et al., Biaxially oriented polypropylene pipes, Plastics, Rubber and Composites 2006 vol 35 no 10, p. 447-454 describes a process for making a biaxially oriented pipe from a random propylene copolymer.

Conditions for Step b)

The skilled person can select suitable conditions such as temperatures for step b) to obtain a biaxially oriented pipe. Step b) is performed at a drawing temperature which results in orientation of the propylene-based polymer in the polymer composition.

The drawing temperature is selected according to the melting point of the propylene-based polymer in the polymer composition.

The drawing temperature is herein defined as the temperature at the surface of the tube of step a) just prior to step b). Before step b), the mandrel and the tube of step a) are heated so that they have the desired drawing temperature. This may be done by soaking the mandrel and the tube of step a) at the drawing temperature for a period sufficient to attain thermal equilibrium, e.g. 30 minutes (the temperature is preferably controlled within ±1° C.).

The melting point is determined by differential scanning calorimetry according to ASTM D3418. The DSC measurements are performed using a DSC TA Q20 and an Intracooler capable of reaching −90° C. The measurements are done under nitrogen flow to avoid degradation. The methodology followed is:
  First Heating: −40° C. to 230° C. @ 10° C./min (3 min hold at the end temperature)
  Cooling: 230° C. to −40° C. @ 10° C./min
  Second Heating: −40° C. to 230° C. @ 10° C./min
  Sample used are between 3 and 5 mg
  Melting point is reported from the second heating cycle.

The drawing temperature may be selected to be lower than the melting point of the propylene-based polymer in the polymer composition.

The drawing temperature may be 1 to 30° C., for example 2 to 20° C. or 3 to 10° C., lower than the melting point of the propylene-based polymer in the polymer composition.

When the propylene-based polymer comprises different propylene-based polymers having different melting points, the drawing temperature may be determined such that orientation of majority of the propylene-based polymers is achieved. The skilled person can suitably determine the suitable drawing temperature depending on the types and the amounts of the propylene-based polymers present in the polymer composition.

Generally, it is possible to select the drawing temperature to be within a suitable temperature range based on the melting point of each of the propylene-based polymers present in the polymer composition.

In case the differences in the melting points of the propylene-based polymers present in the polymer composition are very large, the drawing temperature may be selected based on the propylene-based polymers which is present in a major amount. For example, the drawing temperature may be selected based on the melting point of the propylene-based polymers which is present at a highest amount in the polymer composition. In determining the drawing temperature, it is also possible to ignore a propylene-based polymers which is present in a small amount, e.g. less than 5 wt % of the polymer composition.

In some embodiments, step b) is performed at a drawing temperature of 140 to 160° C., preferably 145 to 155° C.

Draw Ratios

Typically, step b) is performed at an axial draw ratio of 1.1 to 5.0 and an average hoop draw ratio of 1.1 to 3.0.

Preferably, the average hoop draw ratio of 1.1 to 2.0.

Preferably, the axial draw ratio of 1.1 to 4.0, for example 1.1 to 3.6 or 1.1 to 3.2. The axial draw ratio is typically larger for obtaining a biaxially oriented pipe with a higher outer diameter.

The axial draw ratio of the drawn pipe is defined as the ratio of the cross-sectional area of the starting isotropic tube to that of the biaxially oriented pipe (i.e. product), that is, $$\lambda_{axial} = \frac{(\text{Tube } OD)^2 - (\text{Tube } ID)^2}{(\text{Product } OD)^2 - (\text{Product } ID)^2}$$

OD stands for outer diameter and ID stands for inner diameter.

In the case of expanded tube drawing, the hoop draw ratio of the product varies from the inner to the outer wall. These draw ratios are defined as:

$$\lambda_{hoop,inner} = \frac{\text{Product } ID}{\text{Tube } ID}$$
$$\lambda_{hoop,outer} = \frac{\text{Product } OD}{\text{Tube } OD}$$

The average hoop draw ratio can be defined as:

$$\lambda_{average\ hoop} = \frac{\text{Total Draw Ratio } \lambda_{Total}}{\text{Axial Draw Ratio } \lambda_{axial}}$$

Where $$\lambda_{Total} = \frac{\text{Tube Wall Thickness}}{\text{Product Wall Thickness}}$$

Biaxially Oriented Pipe

The biaxially oriented pipe according to the present invention may be a pressure pipe or a non-pressure pipe. The preferred pipe is a pressure pipe.

The biaxially oriented pipe may typically have a wall thickness of 0.3 mm to 10 cm. The biaxially oriented pipe may typically have an outer diameter of 10 mm to 2000 mm. In some examples, the biaxially oriented pipe has an outer diameter of 10 mm to 10 cm and a thickness of 0.3 mm to 3 mm or 1 mm to 3 mm. In some examples, the biaxially oriented pipe has an outer diameter of 10 cm to 50 cm and a thickness of 1 mm to 1 cm. In some examples, the biaxially oriented pipe has an outer diameter of 50 cm to 2 m and a thickness of 5 mm to 10 cm.

Preferably, the biaxially oriented pipe according to the present invention has a time to failure of at least 100 hours, preferably at least 400 hours, more preferably at least 1000 hours, according to ISO 1167-1 determined at a stress level of 20 MPa and a temperature of 20° C.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

Materials:
 rPP1: propylene-ethylene copolymer with comonomer content of 4 wt % and MFR 230° C./2.16 kg of 0.3 g/10 minutes. Tm=142.1° C.
 rPP2: propylene-ethylene copolymer with comonomer content of 1.5 wt % and MFR 230° C./2.16 kg of 0.3 g/10 minutes. Tm=156° C.
 rPP3: propylene-ethylene copolymer with comonomer content of 4 wt % and MFR 230° C./2.16 kg of 1.7 g/10 minutes. Tm=142° C.

Production of Biaxially Oriented Pipe:

Propylene-ethylene copolymer was made into granules using a twin screw extruder. Processing temperature and screw profile were of standard polypropylene compounding. Standard additives for a propylene based pipe were added in making the granules.

These compounded granules were used to produce thick tubular profiles of approximate dimensions of an outer diameter of about 32 mm and an inner diameter of about 16 mm. These thick tubes were drawn over an expanding conical mandrel of exit diameter of 32 mm and semi angle 15 degree at temperature as shown in table 1. Tubes were drawn very uniformly in thickness and could be drawn to low axial draw ratios.

These thick tubes were drawn over an expanding conical mandrel of exit diameter of 61-65 mm and semi angle 15 degree at temperature shown in table 1 at a draw speed of 100 mm/min. Axial draw ratio was 3 and the average hoop draw ratio was 1.3.

The resistance to internal pressure of pipes was determined at 16 and 20 MPa stress level at 20° C. according to ISO 1167-1. The time to failure of the pipe is shown in Table 1.

TABLE 1

|  |  | PP | $T_m$ (° C.) | C2 content (wt %) | Stress (MPa) | Time to failure (hrs) |
|---|---|---|---|---|---|---|
| CEx 1 | undrawn | rPP1 | 142.1 | 4.0 | 16 | 20 |
|  |  |  |  |  | 20 | instantly |
| CEx 2 | biaxially drawn at 140° C. | rPP1 | 142.1 | 4.0 | 16 | 7000 |
|  |  |  |  |  | 20 | ~1 |
| Ex 3 | biaxially drawn at 150° C. | rPP2 | 156 | 1.5 | 16 | >10000 (has not failed yet, test is still running) |
|  |  |  |  |  | 20 | >9072 (has not failed yet, test is still running) |
| Ex 4 | biaxially drawn at 150° C. | 80 wt % rPP2 and 20 wt % rPP3 | 153.5 | 2.0 | 16 | 5868 |
|  |  |  |  |  | 20 | 1400 |

It can be understood that the biaxially oriented pipe made from a propylene-ethylene copolymer with a lower comonomer content has a much longer time to failure.

The invention claimed is:

1. A biaxially oriented pipe made of a polymer composition comprising a propylene-based polymer, wherein the propylene-based polymer comprises a random copolymer of propylene and a comonomer which is ethylene and/or an α-olefin having 4 to 10 carbon atoms, wherein the propylene-based polymer has a comonomer content of 0.1 to 3.8 wt % based on the propylene-based polymer, wherein the pipe has a time to failure of at least 100 hours according to ISO 1167-1 determined at a stress level of 20 MPa and a temperature of 20° C.

2. The pipe according to claim 1, wherein the comonomer content of the propylene-based polymer is 0.5 to 3.5 wt %.

3. The pipe according to claim 1, wherein the propylene-based polymer is a propylene-ethylene copolymer.

4. The pipe according to claim 1, wherein the propylene-based polymer has a melt flow index of 0.1 to 10.0 g/10 min measured according to ISO1133-1:2011 (230° C./2.16 kg).

5. The pipe according to claim 1, wherein the amount of the propylene-based polymer with respect to the total amount of polymers in the polymer composition is at least 95 wt %.

6. The pipe according to claim 1, wherein the polymer composition further comprises 0 to 5 wt % of additives and 0 to 40 wt % of fillers.

7. The pipe according to claim 1, wherein the pipe is made by a process comprising the steps of:
   a) forming a polymer composition into a tube, and
   b) stretching the tube of step a) in the axial direction and in the peripheral direction to obtain the biaxially oriented pipe, wherein step b) is performed at a drawing temperature of 140 to 160° C. and at an axial draw ratio of 1.1 to 5.0 and an average hoop draw ratio of 1.1 to 3.0.

8. The pipe according to claim 1, wherein the random copolymer comprises
   A) a low comonomer random copolymer of propylene and a comonomer which is ethylene and/or an α-olefin having 4 to 10 carbon atoms, wherein the low comonomer random copolymer has a comonomer content of less than 3.8 wt % based on the low comonomer random copolymer and/or
   B) a high comonomer random copolymer of propylene and a comonomer which is ethylene and/or an α-olefin having 4 to 10 carbon atoms, wherein the high comonomer random copolymer has a comonomer content of at least 3.8 wt % based on the high comonomer random copolymer and
   the propylene-based polymer optionally comprises
   C) a propylene homopolymer.

9. The pipe according to claim 8, wherein the total amount of A), B) and C) is at least 95 wt % based on the propylene-based polymer.

10. The pipe according to claim 8, wherein the comonomer content of the low comonomer random copolymers is at least 0.1 wt % based on said random polymer.

11. The pipe according to claim 8, wherein the comonomer content of the high comonomer random copolymers is 3.8 to 10.0 wt % based on said random copolymer.

12. The pipe according to claim 8, wherein the propylene-based polymer consists of A).

13. The pipe according to claim 8, wherein the propylene-based polymer consists of A) and B) or
   the propylene-based polymer consists of A) and C) or
   the propylene-based polymer consists of A), B) and C).

14. The pipe according to claim 8, wherein the propylene-based polymer consists of B) and C).

15. The pipe according to claim 1, wherein the comonomer content of the propylene-based polymer is 0.1 to 3.5 wt %.

16. The pipe according to claim 1, wherein the comonomer content of the propylene-based polymer is 0.1 to 3.4 wt %.

17. The pipe according to claim 1, wherein the comonomer content of the propylene-based polymer is 0.1 to 3.0 wt %.

18. The pipe according to claim 1, wherein the comonomer content of the propylene-based polymer is 0.1 to 2.5 wt %.

19. The pipe according to claim 1, wherein the comonomer content of the propylene-based polymer is 0.1 to 2.0 wt %.

* * * * *